United States Patent [19]

Drummond

[11] Patent Number: 5,665,281

[45] Date of Patent: Sep. 9, 1997

[54] METHOD FOR MOLDING USING VENTING PIN

[75] Inventor: Brian Drummond, Austin, Tex.

[73] Assignee: Motorola, Inc., Schaumburg, Ill.

[21] Appl. No.: 160,310

[22] Filed: Dec. 2, 1993

[51] Int. Cl.$^6$ .................. B29C 33/10; B29C 45/02

[52] U.S. Cl. ............ 264/39; 264/272.17; 425/546; 425/577; 425/812

[58] Field of Search ............ 264/272.14, 272.15, 264/272.17, 39, 272.11; 425/544, 546, 116, 588, 577, 121, 812, DIG. 228

[56] References Cited

U.S. PATENT DOCUMENTS

| | | | |
|---|---|---|---|
| 4,801,561 | 1/1989 | Sankhagowit | 264/272.15 |
| 4,990,077 | 2/1991 | Morita | 425/812 |
| 5,059,558 | 10/1991 | Tatsanakit | 264/272.17 |
| 5,175,007 | 12/1992 | Elliott | 425/588 |

FOREIGN PATENT DOCUMENTS

| | | | |
|---|---|---|---|
| 58-205648 | 11/1983 | Japan | B22C 15/24 |
| 2-10749 | 1/1990 | Japan . | |
| 3-202333 | 9/1991 | Japan | B29C 45/34 |
| 4-19117 | 1/1992 | Japan | B29C 45/26 |
| 4-103316 | 4/1992 | Japan | B29C 45/00 |

OTHER PUBLICATIONS

Letter from T. Hara of Dai–Ichi Seiko Co. Ltd. to Mr. Ming Koh, dated Apr. 22, 1993, re: "YR Fax Dated Apr. 19", pp. 001-002.

*Primary Examiner*—Angela Ortiz
*Attorney, Agent, or Firm*—Patricia S. Goddard

[57] ABSTRACT

A molding method is used to mold a semiconductor device within a molded carrier ring. A mold tool (30) has an upper platen (32) and a lower platen (34). Each platen has a package cavity (36) and a carrier ring cavity (38). Between the package and ring cavities is a venting hole (60) having a venting pin (63) slidably fit therein. The venting pin includes a flat surface (64) that allows air which is forced from the package cavity during molding to escape through a narrow gap. The gap size is made small enough to prevent the passage of resin to flow through. Thus, the invention permits the mold tool to be compression cleaned and prevents mold tool down-time previously experienced when molding resin gets dogged in traditional venting holes. In another embodiment, the venting pin can be placed within the package cavity and also serve as an ejector pin.

6 Claims, 2 Drawing Sheets

METHOD FOR MOLDING USING VENTING PIN

FIELD OF THE INVENTION

The present invention relates to molding methods in general, and more specifically to molding methods having means for venting air from mold cavities.

BACKGROUND OF THE INVENTION

During molding operations, there is a need to vent air from cavities within a mold tool that define the object to be molded. As a molding compound enters the cavity, it compresses any air in the cavity. If there is no means for the air to escape, the resulting molded object will have defects caused by the trapped air pockets.

A known method for venting air from mold cavities is to provide the mold tool with venting holes. One application of the use of venting holes is in the semiconductor industry, where semiconductor devices are often transfer molded to create plastic encapsulating bodies which protect sensitive semiconductor elements, such as integrated circuit die, from environmental influences. In molding a typical plastic package about a semiconductor element, air is often vented out of the package cavity of the mold through very narrow recesses or troughs formed in the mold tool, commonly located at the corners of the package cavity. These recesses are made shallow enough to prevent the molding compound from seeping through the recesses. The recesses lead to more voluminous cavities in the mold or extend to the periphery of the mold where air is released into the atmosphere.

Molding one particular type of semiconductor package, known as a molded carrier ring (MCR), poses a venting problem which cannot be handled by traditional corner venting recesses. A typical semiconductor device 10 packaged in an MCR is illustrated in FIG. 1. Device 10 includes a molded ring 12 and a molded package body 14. A semiconductor element (not illustrated in FIG. 1), such as an integrated circuit die, is encapsulated by package body 14. A plurality of conductive leads 16 of a conventional metal lead frame (not fully illustrated) extend from the package body to the carrier ring. The leads are electrically coupled to the internal semiconductor element by conventional means, for example wire bonds (not shown). In prior processes, ring 12 and package body 14 are formed using a transfer molding technique wherein a resin molding compound is introduced into a ring cavity by way of a first mold gate 20. The resin then flows around the ring, as the arrows in FIG. 1 indicate, and is introduced into a package cavity by way of a second mold gate 22. Because the ring cavity is filled before the package cavity and because the ring cavity completely surrounds the package cavity, air which is forced out of the package cavity must be vented through an area of the mold tool contained within the ring.

In existing MCR transfer molding systems, a venting hole is formed in a bottom platen of a mold tool, in between the package cavity and the ring cavity. Air is transferred from the package cavity through venting recesses in the corners of the package cavity, as in traditional plastic packages without a carrier ring. But rather than being vented to the atmosphere or another large cavity within the mold, the air is directed to the venting hole, having a diameter on the order of 2.0 mm. The venting hole is sufficient to vent the air from the package cavity during molding of an MCR package; however, this design poses other manufacturing problems. One problem occurs in automated molding equipment which automatically transfers lead frames through the mold tool. If such equipment happens to misalign a lead frame within the mold tool, the mold platens may not close properly. Upon shooting the mold compound, which the equipment will do if it cannot detect the misalignment, the mold compound will not only fill the package and ring cavities, but will also fill the venting recesses and venting holes because the package and ring cavites of the mold platens are not properly dosed. If this occurs, the mold tool must be shut down for cleaning, causing lengthy and costly down time.

Another problem with conventional mold designs for MCR packages is that these molds cannot be compression cleaned. Periodically, mold tools must be cleaned to remove residue which builds up on the mold platens. In semiconductor manufacturing, two mold cleaning methods are prevalent, transfer cleaning and compression cleaning. In a transfer cleaning process, a pellet of cleaning resin, for instance melamine, is shot through the mold in the same manner as a pellet of molding compound is shot to form the package. Thus, a dummy lead frame is positioned in the mold tool and a package and a ring of the melamine compound is formed about the lead frame as if it were an actual semiconductor device lead frame (only the melamine package and ring are typically white whereas semiconductor grade molding compound is black). In a compression cleaning process, the melamine, or other cleaning resin, is simply spread over the bottom platen of a mold tool. The top and bottom mold tools are brought together to compress the melamine. Since there is not a lead frame in the mold tool, the melamine spreads across the entire top and bottom platen, filling every cavity. If this compression cleaning technique were used in a conventional MCR mold tool, the melamine would also fill the venting hole, thereby requiring extended down-time. Therefore, existing MCR tools are limited to the transfer cleaning method. However, transfer cleaning has disadvantages as compared to compression cleaning, in that transfer cleaning 1) must be done more frequently; 2) is less effective at removing residue; and 3) is more costly.

Accordingly, there is a need for a method for molding semiconductor devices, especially for molding MCR devices, that enables the use of compression cleaning techniques and that reduces the need for mold down-time if lead frame misalignment occurs.

SUMMARY OF THE INVENTION

The present invention is a method for molding an object. The method includes providing a mold tool having a cavity which defines the object to be molded and a means for venting air from the cavity. The means for venting air comprises a venting hole in the mold tool which is displaced from the cavity. Within the hole is a venting pin which has a flat surface. The flat surface of the pin creates a gap between the pin and venting hole. There is also included a means for transferring air from the cavity to the venting hole. To mold the object, a molding resin is introduced into the cavity while forcing air from the cavity through the gap within the venting hole.

These and other features of the invention, as well as its advantages, will be more clearly understood from the following detailed description taken in conjunction with the accompanying drawings. It is important to point out that the illustrations may not necessarily be drawn to scale, and that there may be other embodiments of the present invention which are not specifically illustrated.

DETAILED DESCRIPTION OF A PREFERRED EMBODIMENT

The present invention overcomes the aforementioned problems with conventional MCR molding systems by providing a venting pin within a venting hole. Together the venting pin and venting hole allow air to escape but prevent molding and cleaning resins from entering the hole. In a preferred embodiment, the venting pin slidably fits within the hole and is provided with at least one flat surface (called a flat). The flat creates a gap between the pin and the venting hole which is large enough to allow air to escape but small enough to prevent resin from entering. In one embodiment, the pin is made retractable during the actually molding step and is integrated with an existing ejector pin system. The invention permits the use of compression cleaning techniques, and eliminates down-time due to lead frame misalignment, because the neither resin cleaning compounds or molding compounds can seep into the hole since the gap is so small.

Figure 1:
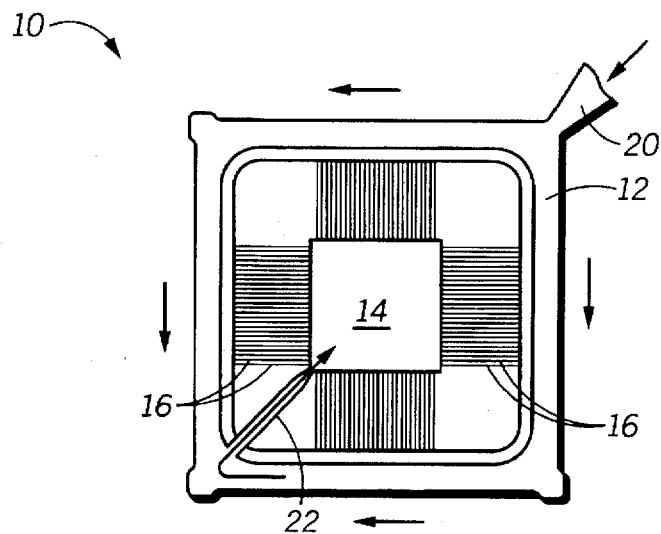
FIG. 1 is a top down view of a known molded carrier ring (MCR) semiconductor device.
Figure 2:
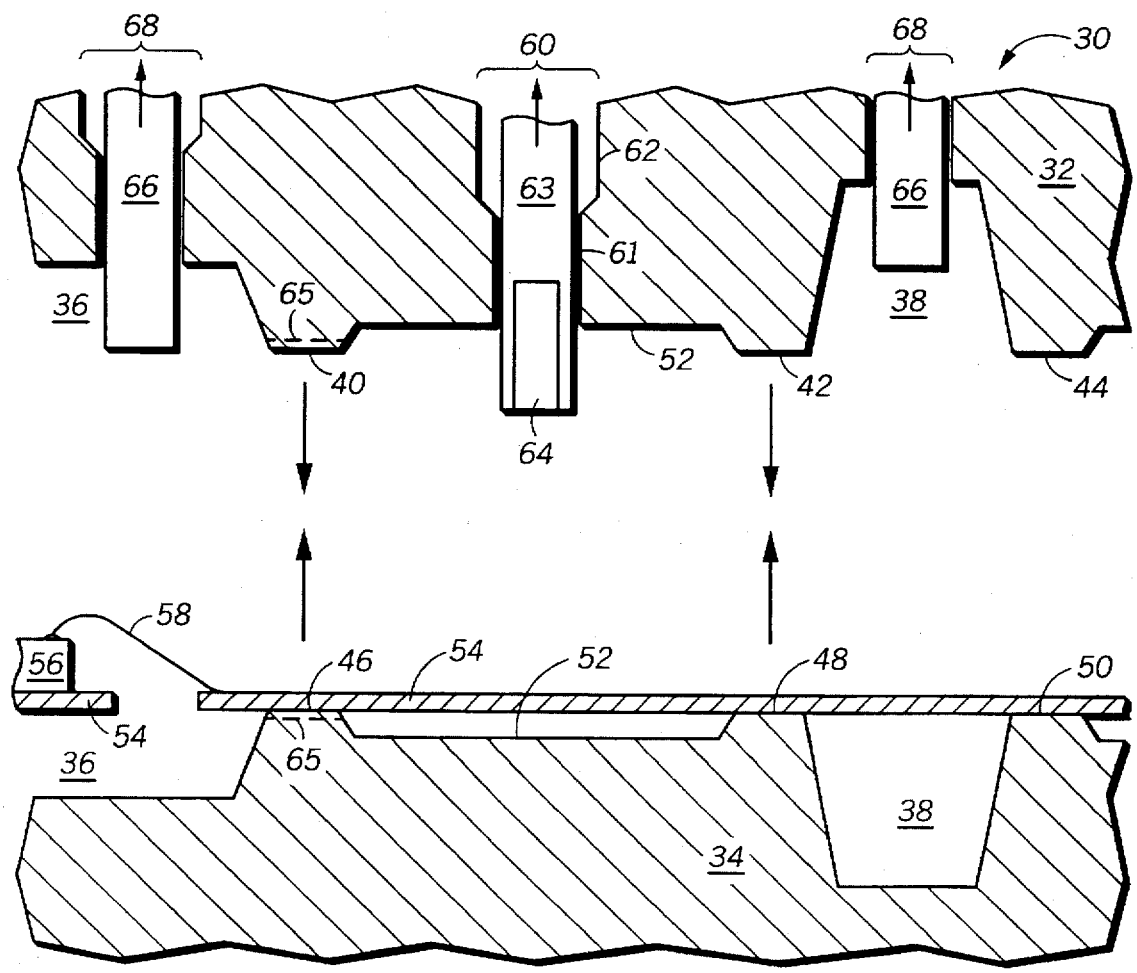
FIG. 2 is a cross-sectional view of a portion of a mold tool in an open position, suitable for practicing the present invention.

FIG. 2 illustrates a cross-sectional view of a portion of a mold tool 30, such as a transfer mold tool, which is suitable for practicing the present invention. Mold tool 30 includes an upper mold platen 32 and a lower mold platen 34. As illustrated, platens 32 and 34 are in an open position. Within each mold platen is a package cavity 36 and a carrier ring cavity 38. In each platen, ring cavity 38 encircles package cavity 36, but as illustrated only the right half of the ting cavity appears. Because the mold tool has a symmetric configuration, there is no need to illustrate the left portion for purposes of understanding the present invention. Upper mold platen 32 also includes three clamping areas 40, 42, and 44, while lower mold platen 34 has three corresponding clamping areas 46, 48, and 50. Between clamping areas 40 and 42 of the upper platen, and corresponding areas 46 and 48 of the lower platen, is a clamping relief cavity 52. The functions of the clamping areas and clamping relief cavities are discussed in more detail below.

Positioned on lower platen 34 of the mold tool is a metal lead frame 54 having a semiconductor integrated circuit element 56 mounted thereon. The integrated circuit element is electrically coupled to leads of lead frame 54 by way of wire bonds 58 (only one of which is illustrated). As positioned, element 56 is within package cavities 36 while portions of the lead frame extend into both the package cavities 36 and the carrier ring cavities 38. Thus, upon molding, element 56 will be encapsulated in a resin package body, while portions of the lead frame, in particular leads of the lead frame, will be encapsulated by the molded package body and the mold carrier ring. The lead frame structure, including element 56 and wire bonds 58, is well known and understood in the semiconductor manufacturing industry. Therefore, details on how such a structure is formed, of what materials, and the like, is not needed for the purposes of understanding the present invention.

In accordance with the present invention, one of the mold platens is provided with a venting hole 60. While venting hole 60 is illustrated as being formed in upper platen 32, it is also understood that it may instead, or in addition, be formed in lower platen 34. In one embodiment of the invention, venting hole 60 has two portions. A first portion 61 is a adjacent clamping relief cavity 52. Above first portion 61 is a second portion 62. Second portion 62 has a diameter which is larger than that of first portion 61, for reasons to be discussed below. Within venting hole 60 is a venting pin 63. Venting pin 63 has a slidable fit within first portion of 61 (i.e. surfaces of the pin and the hole are in contact with one another but the pin can still move up and down within the hole). However, for the sake of clarity, pin 63 and venting hole 60 are not illustrated as being in contact. As one example, which is not intended to limit the scope of the present invention, first portion 61 of venting hole 60 has a diameter of 2.0+0.002 mm and second portion 62 has a diameter of 2.5 mm, while venting pin 63 has a diameter of 2.0–0.002 mm (i.e. there is a 0.002 mm clearance between the venting pin and the venting hole). Both venting hole 60 and venting pin 63 have substantially circular or round cross-sectional areas. In accordance with the present invention, venting pin 63 is also provided with at least one flat surface 64, also herein referred to simply as a flat.

Also provided in upper mold platen 32 is a plurality of conventional ejector pins 66 within ejector pin holes 68. In one embodiment of the present invention, ejector pins 66 and ejector pin holes 68 have the same diameters as venting pin 63 and venting hole 60, respectively. In the open position of mold tool 30 illustrated in FIG. 2, the ejector pins extend into package cavity 36 and ring cavity 38. Upon closing, the ejector pins retract as the arrows indicate. As the name implies, ejector pins 66 are used to eject the molded objects from the mold after completion of the molding cycle. Although illustrated in only the upper platen, many molding systems include such ejector pin systems in both upper and lower platens of the mold.

Figure 3:
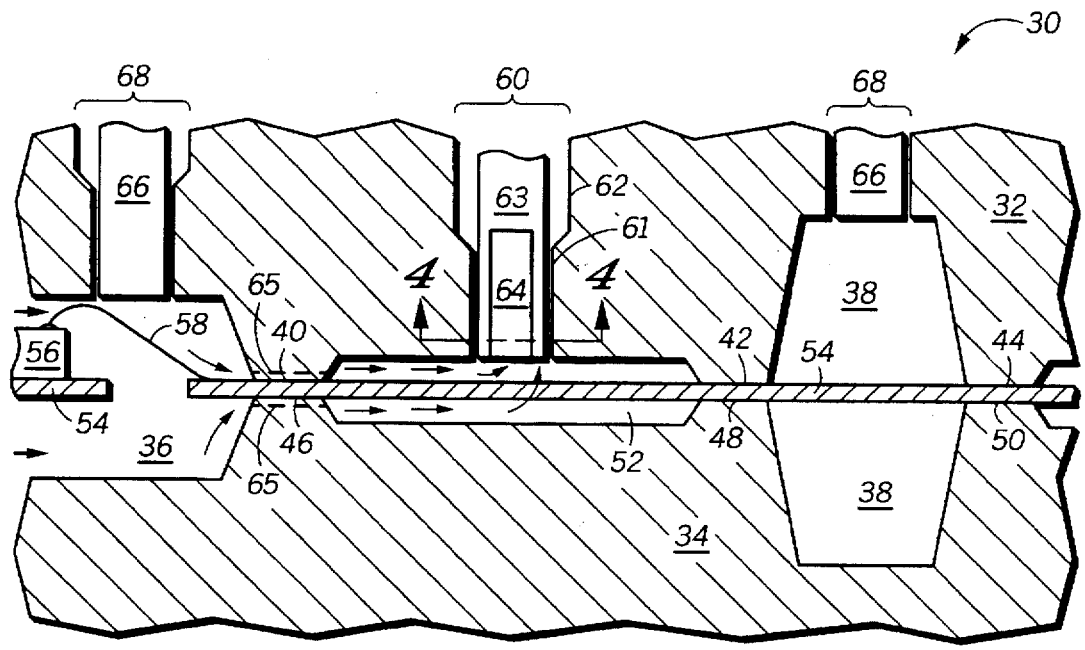
FIG. 3 is a cross-sectional view of the mold tool portion of FIG. 2 in a closed position.

In operation, mold tool 30 works as follows. Platens 32 and 34 are brought together as illustrated in FIG. 3. Once together, clamping areas 40, 42 and 44 are tightly pressed against corresponding clamping areas 46, 48, and 50, respectively. Between the clamping areas of the upper and lower platens is lead frame 54. Thus, together lead frame 54 and each of the clamping areas ensure that package cavity 36 and ring cavity 38 are sealed tightly on all sides to prevent seepage of molding compound from these cavities. To concentrate as much force against the lead frame as possible, and thus minimize the chance of resin seepage, the clamping areas are made as small as possible. Clamping relief cavities 52 enable the clamping area to be made small, and furthermore actually define the clamping area.

As discussed previously, the mold must be equipped with some means for venting air from package cavity 36 once molding compound is therein introduced. In accordance with the present invention, air escapes the package cavity as indicated by the arrows in FIG. 3. The larger arrows represent the path of a molding compound entering the package cavities, while the smaller arrows represent the path air is forced to escape the cavity. Note that in a preferred embodiment of the present invention, by the time the package cavities are being filled with molding compound, the ring cavities are already filled. Thus, the ring cavities cannot be used to vent air from the package cavities. However, the present invention is also applicable to molding processes with only a single cavity for molding (for example molding a semiconductor package without an MCR).

As illustrated, one or both mold platens are equipped with venting trough or recesses 65 (shown in phantom above and below clamping areas 40 and 46, respectively) to carry air from package cavity 36 to damping relief cavity 52. Venting recesses 65 are like those used in prior art molding systems, and are typically provided in corners of the package cavity. Venting recesses are made very shallow, for example on the order of 0.0006 inches (0.015 mm) to prevent any mold compound from escaping the package cavity. Venting recesses 65 lead to damping relief cavity 52. In most applications, clamping relief cavity 52 will be of insufficient volume to completely contain all air that is vented from package cavity 36. Accordingly, some of the air will escape through venting hole 60.

Figure 4:
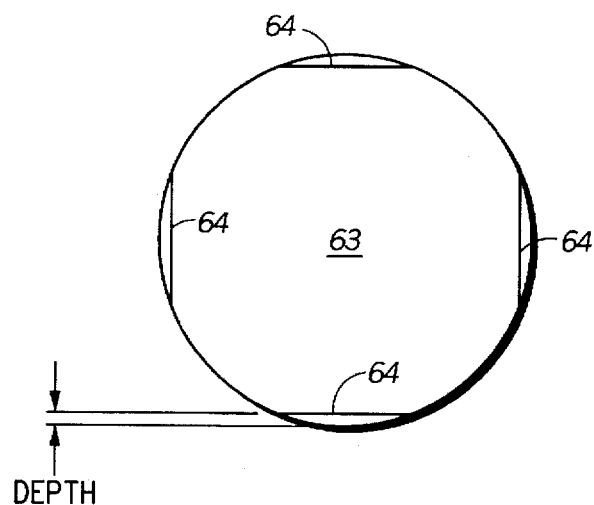
FIG. 4 is a cross-sectional view of a venting pin, taken along the line 4—4 of FIG. 3, suitable for use in practicing the present invention.

As illustrated in FIG. 3, upon bringing platens 32 and 34 together, venting pin 63 is retracted, along with ejector pins 66. In retracting venting pin 63, flat 64 extends above first portion 61 of the venting hole. With the venting pin retracted, a gap is created between flat 64 and the first portion 61 of the venting hole. This gap is more clearly understood in reference to FIG. 4, which is a cross-sectional view of venting pin 63 through the line 4—4 of FIG. 3. As FIG. 4 indicates, venting pin 63 is substantially circular with the exception of four flat surfaces 64. (It is important to note, however, that any number of flats, as few as one, can be used in accordance with the present invention). Since the venting pin is slidably fit within the venting hole, all outer surfaces of the venting pin are in contact with the hole except the flat surfaces. Accordingly, a gap is created which is equal in width to the depth of the flat (For purposes of the present invention, the depth of a flat is equal to the distance the flat is removed from the circumference of the pin, as indicated in FIG. 4). Where the venting pin and venting hole surfaces are in contact, air cannot readily escape. With the presence of this gap, air may escape from damping relief cavity 52 through venting hole 60 by way of the gaps created by flat(s) 64.

It is important to note that in order for the gap to be effective, flat 64 must extend slightly beyond first portion 61 of venting hole 60 in the retracted position. In other words, the length or height of the flat must be slightly greater than that of first portion 61. If the flat does not extend beyond the first portion, air could not escape since the first portion of the venting hole would be blocked closed by a portion of the venting pin which is completely round (i.e. there would be no gap). It is also important to note that venting hole 60 need not include two distinct portions 61 and 62 having differing diameters. However, if the venting hole is one continuous diameter, the venting pin flats) must to designed to provide the requisite gap for air to escape through a sufficient portion, perhaps the entire length, of the venting hole. Similarly, it is not required the venting pin be retractable. In a preferred embodiment of the present invention, the venting pin is retractable as a matter of convenience to fit the venting pin into an existing system of retractable ejector pins (discussed further below).

A significant advantage of the present invention over prior art methods is that mold tool 30 may be compression cleaned. As explained above, in a compression cleaning process, a cleaning resin (e.g. melamine) is compressed throughout all cavities of both the upper and lower mold platens, including any clamping relief cavities, such as damping relief cavity 52. In prior art molding processes for MCR devices, the damping relief cavity between the package cavity and carrier ring cavity was provided with a using compression cleaning techniques. With the present invention, compressed into the camping relief cavities, it would also be compressed into the venting holes. Accordingly, MCR molding tools could not be cleaned however, compression techniques may be used. Although venting hole 60 is likewise extend into a clamping relief cavity as in prior art processes, the presence of venting pin 63 prevents cleaning resin from seeping into the venting hole. This prevention is achieved by making the gap between flat 64 and the surfaces of venting hole 60 small enough so that the resin cannot pass through. For many semiconductor resins, a gap of approximately 0.0006 (0.015 mm) inches or less is appropriate. This dimension is suitable for molding resins as well as cleaning resins commonly used in semiconductor packaging. (For other applications, the gap diminersion will depend on the viscosity of the material being molded). Also with respect to compression cleaning, the gap created by flat 64 and the venting hole is unlikely to get clogged with residue, because during a compression clean the venting pin and ejector pins are not filly retracted, since the mold platens are not completely closed, so that a lower portion of the venting pin gets cleaned as well. Accordingly, the present invention is immune from downtime caused by lead frame misalignment in automated molding equipment discussed above.

Yet another advantage of the present invention is that a venting pin can be easily incorporated into a mold platen along with an existing system of ejector pins. Ejector pins are well known in the area of molding to help release the molded object from the mold tool. In one known semiconductor device mold tool, ejector pins within a mold platen are made retractable upon dosing the upper and lower mold platens so as not to create any markings in the mold object. In another known system, the ejector pins are not retracted upon dosing that the pin markings are made in the molded objects. Furthermore, one platen may include retractable pins while the other platen's pins are not retractable. The present invention may be used in conjunction with either of these systems, as long as a sufficient gap is maintained between the venting pin and the venting hole during the actual molding operation. Venting pin 63 may be easily incorporated in one or both mold platens at the time ejector pins are similarly formed, thereby adding only negligible cost increase to the mold tool.

Furthermore, the present invention may be incorporated into an existing mold tool having a system of ejector pin, without the need to create a separate pin for venting. In other words, in one embodiment of the invention, one or more ejector pins, such as ejector pins 66, may be provided with a flat, such as flat 64, to achieve the desired gap for venting air. Cross-utilization of pins for both ejecting purposes and venting purposes cuts down, at least by one per cavity, the number of pins required in a mold tool. A potential disadvantage in using an ejector pin for venting in the mold cavity is that every time an object is molded, it would be difficult to clean the ejector/venting pin during an auto-mold cleaning process. In an auto-mold cleaning process, a double-sided oscillating brush with air blow-off travels in between the upper and lower mold platens, cleaning any molding residue that is on the platen surfaces. The cleaning difficulty is due to the fact that in a non-retracted position, for example as in FIG. 2, an ejector/venting pin within a mold cavity would not protrude sufficiently to be cleaned. Thus, to lessen the exposure of the ejector/venting pin to molding compound (and thus to alleviate the need for auto-mold cleaning), a venting pin which is not contained within molding cavity may be desired. However, it is understood that present invention is likely to also have benefits where a pin, as herein described, is used within the cavity of the object to be molded.

Thus it is apparent that there has been provided, in accordance with the invention, a method for molding using a venting pin that fully meets the need and advantages set forth previously. Although the invention has been described and illustrated with reference to specific embodiments thereof, it is not intended that the invention be limited to these illustrative embodiments. Those skilled in the art will recognize that modifications and variations can be made without departing from the spirit of the invention. For example, the present invention may be practiced using more than one venting pin per molded object. Furthermore, molding a plurality of objects simultaneously may require the use of a plurality of venting holes and pins. In addition, the invention is not limited to any particular number of flats on a venting pin. The number of flats, and depth of each flat, may be optimized to the particular resin being molded, the mold tool system being used, and the amount of air required to be vented from a given cavity. For example, one flat may be sufficient for small amounts of air but as the mold object cavity size increases additional flats and/or additional venting holes may be required. Nor is the invention limited to any particular venting pin diameter. Rather, the venting pin and flat dimensions will vary with the mold cavity required to be vented. It is also understood that the present invention is not limited to molding MCR type structure, but may be employed in any molding process having the need to vent air from the mold cavity. Furthermore, if used in an MCR application, the present invention is not limited to processes in which the ring cavity is filled before the package cavity. Therefore, it is intended that this invention encompass all such variations and modifications as fall within the scope of the appended claims.

I claim:

1. A method for molding comprising the steps of:

providing a resin compound for molding;

providing a mold tool having first and second platens which oppose one another, each of the first and second platens comprising a package cavity, a package ring cavity which surrounds the package cavity, a clamping area next to the package cavity, and a clamping relief cavity next to the clamping area, said clamping area and said clamping relief area being located between the package cavity and the package ring cavity, and wherein at least one of the first and second platens comprises:

a venting hole extending from the clamping relief cavity, the venting hole having a first diameter and a first portion; and a venting pin slidably fit within the venting hole and having at least one flat formed thereon, wherein the at least one flat has a depth from a circumference of the venting pin which creates a gap between the venting pin and the venting hole, and wherein the gap is sufficiently small to prevent seepage of the resin compound into the venting hole;

providing a lead frame having a semiconductor element coupled thereto;

bringing the first and second platens together such that the package cavity, the clamping area, the clamping relief cavity, and the package ring cavity of the first platen are aligned with the package cavity, the clamping area, the clamping relief cavity, and the package ring cavity, respectively, of the second platen, such that the lead frame is positioned between the first and second platens, and such that the semiconductor element is contained within the package cavity of each of the first and second platens and portions of the lead frame extend into the package cavity and the package ring cavity;

retracting the venting pin into the venting hole, wherein upon retracting the gap is created between the at least one flat of the venting pin and the venting hole and the at least one flat extends beyond the first portion of the venting hole; and introducing the resin compound into the package cavity of each of the first and second platens to encapsulate the semiconductor element, thereby forcing air from the package cavity to the clamping relief cavity and through the gap created between the at least one flat of the venting pin and the venting hole;

wherein the step of retracting is performed before the step of introducing the resin compound.

2. The method of claim 1 further comprising the step of cleaning the first and second platens using a compression clean, the step of cleaning comprising the steps of;

dispensing a cleaning resin compound on one of the first and second platens; and bringing the first and second platens together to compress the cleaning resin compound and fill the package cavity and the clamping relief cavity of each platen, without seepage of the cleaning resin compound into the venting hole.

3. The method of claim 1 wherein the step of providing a molding tool comprises providing a molding tool wherein the first platen has a plurality of retractable ejector pins for ejecting the semiconductor element once encapsulated, and wherein the venting pin is in the first platen.

4. The method of claim of claim 3 further comprising the step of retracting the plurality of retractable ejector pin and the venting pin while bringing the first and second platens together.

5. The method of claim 1 wherein the step of providing a mold tool comprises providing a transfer mold tool.

6. The method of claim 1 wherein the step of introducing the resin compound further comprises introducing the resin compound into the package ring cavity of each of the first and second platens, and wherein the resin compound is introduced into the package ring cavity of each platen before being introduced into the package cavity of each platen.

* * * * *